United States Patent [19]
Abel

[11] 3,765,575

[45] Oct. 16, 1973

[54] INJECTION MACHINES FOR WICKING MATERIAL

[76] Inventor: Martin L. Abel, 25235 Canterbury, Franklin, Mich.

[22] Filed: Mar. 25, 1971

[21] Appl. No.: 128,074

[52] U.S. Cl.............. 222/227, 222/235, 222/318, 222/333
[51] Int. Cl. .......................................... G01f 11/00
[58] Field of Search.................. 222/333, 318, 227, 222/235, 252, 263, 334, 383; 417/900

[56] References Cited
UNITED STATES PATENTS

| | | | |
|---|---|---|---|
| 1,801,414 | 4/1931 | Davis | 222/318 |
| 3,053,421 | 9/1962 | Abel | 222/318 X |
| 3,401,847 | 9/1968 | Downing | 222/334 X |

Primary Examiner—Robert B. Reeves
Assistant Examiner—John P. Shannon
Attorney—Lane, Aitken, Dunner & Ziems

[57] ABSTRACT

An injection machine accurately meters a quantity of lubricated wicking material to be injected during operation of the machine. The lubricated wicking material is advanced through the machine by a reciprocating piston driven by a motor through a belt drive and power transmission. The power transmission is separately lubricated and a reciprocating piston is connected thereto so as to prevent commingling between the power transmission lubricant and the lubricated wicking material. Metered quantities of unadulterated wicking material are thereby supplied to be injected by the machine while the power transmission lubrication is not contaminated by the wicking material.

4 Claims, 3 Drawing Figures

INVENTOR
MARTIN L. ABEL

BY Lane, Aitken, Dunner & Ziems
ATTORNEY

INVENTOR
MARTIN L. ABEL

BY Lane, Aitken, Dunner & Ziems
ATTORNEYS

INJECTION MACHINES FOR WICKING MATERIAL

BACKGROUND OF THE INVENTION

1. Field of the Invention

This invention relates to an improved injection machine and more particularly to one having an improved power drive for the mechanism which advances the material through the machine.

2. Description of the Prior Art

Machines have been designed to inject metered quantities of a lubricated wicking material composed of small lengths of loose fibers (substantially all of which are approximately less than 3.5 millimeters in length) soaked with a bearing oil. An example of such a machine is the injection machine disclosed in my U.S. Pat. No. 3,053,421 which issued Sept. 11, 1962.

The injection machine disclosed in my above-mentioned patent permitted the power transmission lubrication to mix with the lubricated wicking material. As more demanding bearing lubrication problems presented themselves it became necessary to make the lubricated wicking material with different oils to meet these demands.

SUMMARY OF THE INVENTION

In accordance with the present invention, it was found that many of the oils used in the lubricated wicking material were unsuited for power transmission lubrication, and that permitting these oils to mix with the power transmission lubricant was deleterious to the proper operation of the power transmission. Specifically, in the injection machine disclosed in my above-noted patent, a connection between the reciprocating piston and a driving crank to which it is pinned is made inside a single housing. The necessary motion of the connecting pin is accommodated by an internal slot in the housing which permits the requisite reciprocating motion. It is through this slot that the mixing of the lubricants takes place. The improvement of the present invention prevents this undesired mixing.

An object of the present invention is to provide an improved injection machine of the above-mentioned type which can inject an oil impregnated wicking material into bearing reservoirs without contaminating the transmission lubricant of the machine with the wicking material oil.

Another object of the invention is to provide an improved injection machine of the above-mentioned type which is simple in construction, reliable and efficient in operation, economical of manufacture, and trouble-free in operation.

Further objects and advantages of the present invention will become apparent and the exact nature of the invention will be clearly understood when the following description is considered in conjunction with the drawings.

DESCRIPTION OF THE PREFERRED EMBODIMENTS

Figure 2:
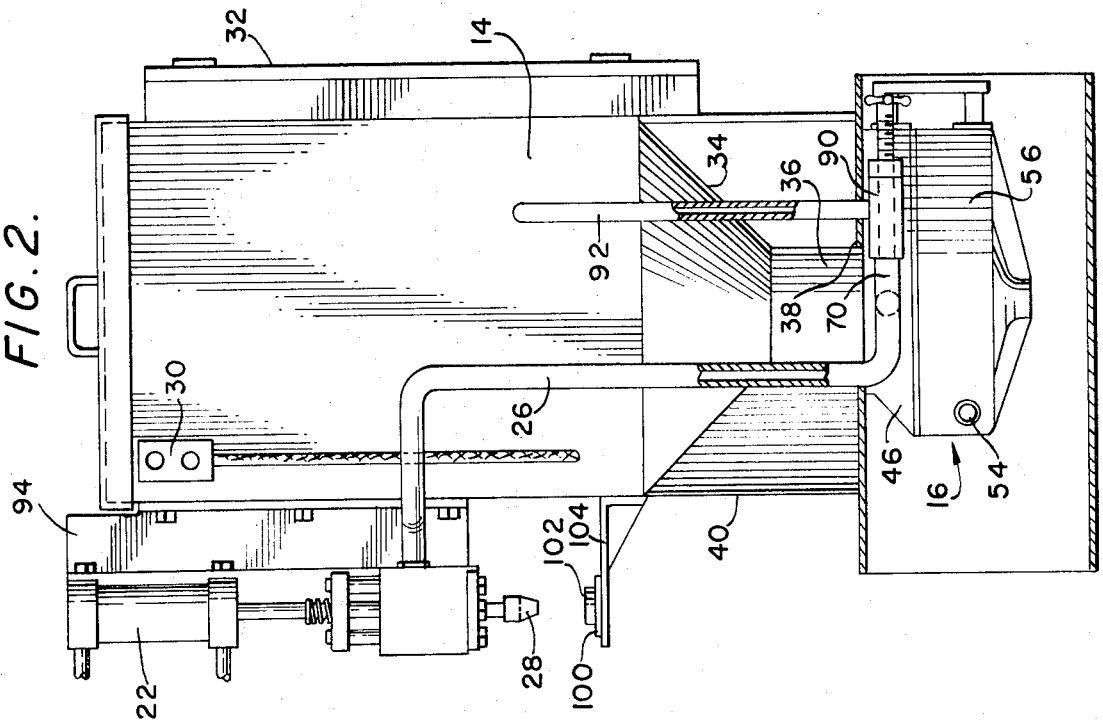
FIG. 2 is a broken enlarged view partly in elevation and partly in section of the machine illustrated in FIG. 1.
Figure 1:
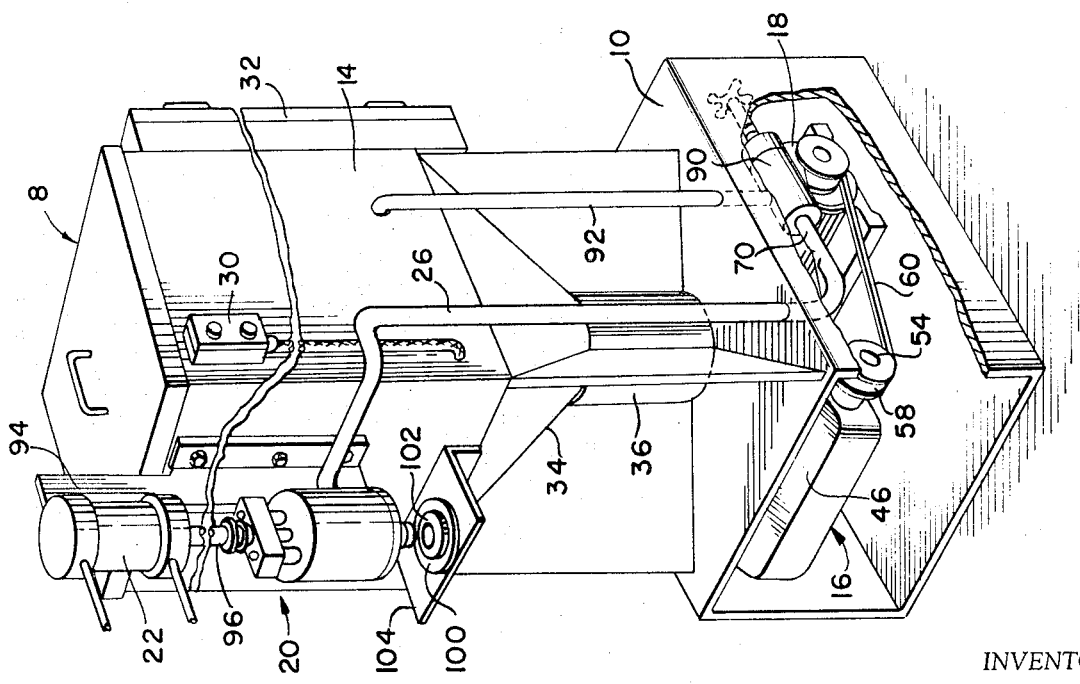
FIG. 1 is a perspective view of an injection machine embodying the present invention in which part of the housing is broken away to afford a view of the apparatus within the housing.
Figure 3:
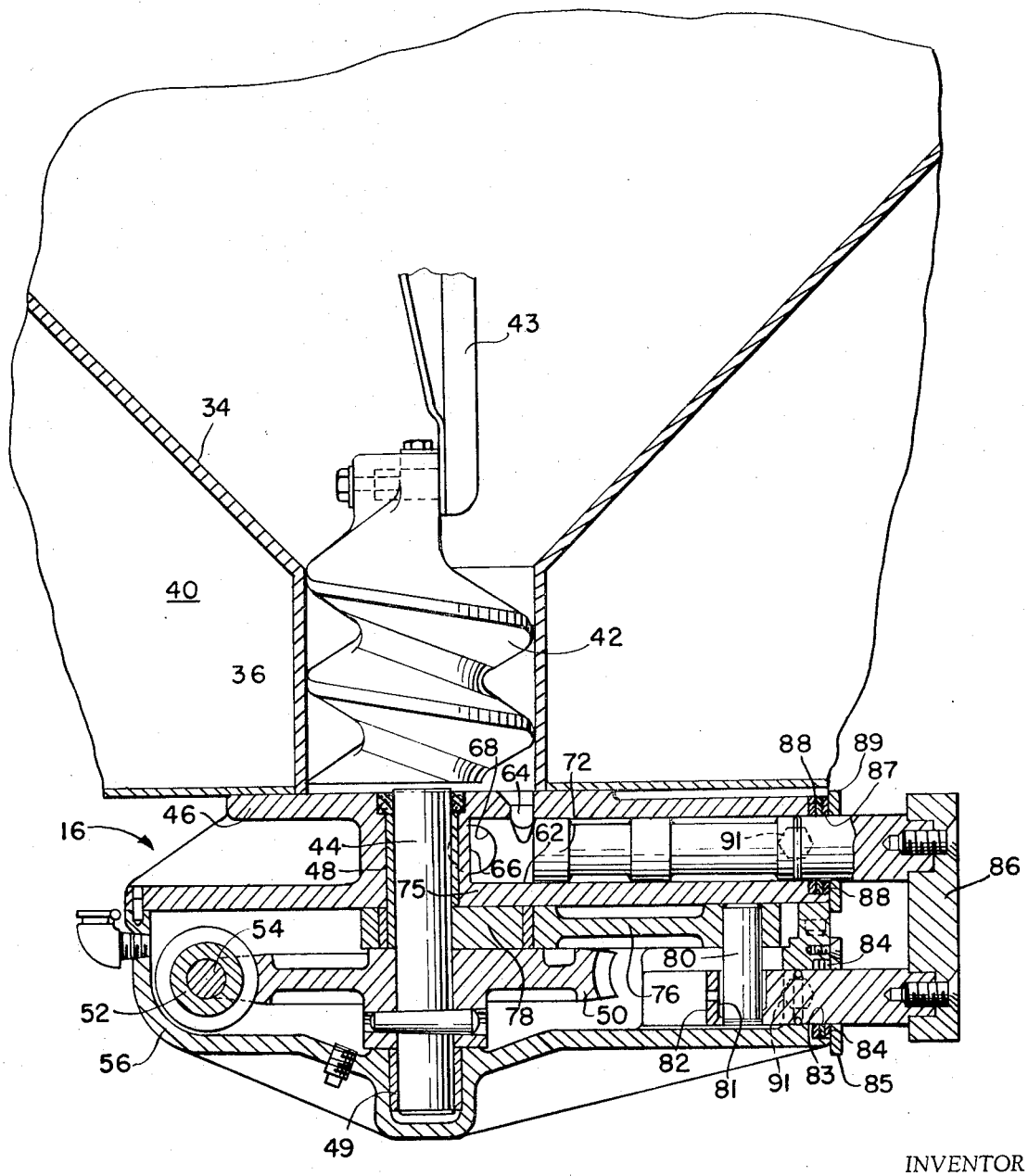
FIG. 3 is a broken enlarged vertical sectional view of the hopper and the pump mechanism.

In the preferred embodiment of the present invention illustrated in FIGS. 1, 2 and 3 the improved injection machine 8 is illustrated as including a housing 10 upon which is mounted a hopper 14. The housing 10 contains a pump mechanism 16, driven by a motor 18. The pump mechanism 16 receives material from the hopper 14 as hereinafter described and delivers it under pressure to a valve and metering mechanism 20 through a discharge line 26. Operation of the injection machine is affected by suitable controls 30 and 32 mounted on the exterior of the hopper 14 so that material is supplied under pressure to the injection nozzle 28.

Referring to FIGS. 1, 2 and 3 the hopper 14 has an inclined bottom 34 which slopes inwardly to a downwardly extending cylindrical portion 36 which projects through an opening 38 provided in the top of the housing 10. The hopper is supported on the upper surface of the housing 10 by four outwardly extending webs 40 extending between the bottom 34 of the hopper 14 and the top of the housing 10. Within the downwardly extending cylindrical portion 36 of the hopper 14 is a vertically disposed auger 42. The auger 42 is mounted on a shaft 44 which extends downwardly into the housing 10 and into the pump mechanism 16 mounted in the housing 10 directly below the hopper 14. At its upper end the auger 42 carries an agitator rod 43 mounted thereon in a suitable manner for constantly agitating the material within the hopper during rotation of the auger 42.

The pump mechanism 16 includes an upper casing 46 having a sleeve bushing 48 in which the upper end of the shaft 44 is journaled. The shaft 44 is driven through a worm gear 50 keyed thereto, which in turn is driven by a worm 52. The worm 52 has a shaft 54 extending outwardly through a lower pump casing 56. The shaft 54 carries a pulley 58 driven by the motor 18 through a conventional V-belt 60. The lower end of the shaft 44 is journaled in a sleeve bearing 49 mounted at the bottom of the lower casing 56. The upper casing 46 and the lower casing 56 combine to house the pump mechanism 16.

The upper casing 46 includes a cylindrical pumping chamber 62 which is disposed at right angles to the shaft 44. The cylindrical pumping chamber 62 has an opening 64 spaced outwardly from its closed inner end 66 which communicates with the interior of the cylindrical portion 36 of the bottom of the hopper 14. The pumping chamber 62 also communicates with a transversely extending passage 68 which serves as the outlet of the pumping mechanism 16. Passage 68 delivers material under pressure to the material supply line 70 extending from the pump mechanism 16 to the valve and metering mechanism 20. Disposed within the pumping chamber 62 is a piston 72 reciprocation of which is effected by a horizontally disposed crank 76 operated by an eccentric 78 powered by the shaft 44. This crank 76 is disposed within the lower casing 56 of the pump mechanism 16 between the worm gear 50 and the bushing 48 in the upper casing 46. The lower casing 56 is attached to the upper casing 46 so that no direct, internal communication exists between cylindrical pumping chamber 62 and the chamber formed by the lower casing 56. At its outer end the crank 76 carrys a pin 80 which projects downwardly through a slot 81 in a rod 82. The rod 82 projects out of the lower casing 56 through an aperture 83 provided in its outer portion. This aperture 83 is provided with seals 84 held in place by a cover plate 85 having an opening therein to permit the passage therethrough of the rod 82. Attached to the outermost portion of the rod 82 is the lower portion of a tie plate 86. The upper portion of the tie plate 86 is attached to the outermost portion of the piston 72. The outermost portion of the piston 72 extends outwardly of the upper casing 46 through an aperture 87 which aperture is sealed by the use of seals 88 and a cover plate 89 having a hole therein for the passage therethrough of the outer portion of the piston 72. It is apparent that as the inner end of the piston 72 moves under and closes the aperture 64 the material which has been directed into the cylindrical chamber portion by the auger 42 will be positively forced into the inner end of the cylindrical chamber 62. Continued movement of the piston 72 will force the material outwardly through the outlet passage 68.

To maintain proper pressure in the material supply line 70 a by-pass valve 90 is provided. This bypass valve 90 permits the material to return from the supply line 70 to the hopper 14 when the pressure in the material supply line 70 exceeds a predetermined value. The by-pass valve might be of the type illustrated in FIG. 5 of my above-mentioned patent, the operation of which is described in column 3 of said patent.

The supply line 70 is coupled to a discharge line 26 which in turn is connected to the valve and metering mechanism 20. Attached to the upper portion of the hopper 14 is a plate 94 which supports an air cylinder 22. A shaft 96 is operated by the air cylinder 22. The valve and metering mechanism may be of the type illustrated in FIGS. 2, 3 and 4 of the patent to Tann, U.S. Pat. No. 3,268,638, which issued Aug. 23, 1966 and is assigned to the assignee of the present invention. The operation of the valve and metering mechanism 20 is described in columns 2 and 3 of the above-mentioned Tann patent.

To operate the improved injection machine, the push button switch 30 is pushed to start the motor 18, a suitable amount of the lubricant impregnated material having been placed in the hopper 14. After a short initial period, the operation of the pump mechanism 16 fills the supply line 70, the discharge line 26 and the passages in the valve and metering mechanism 20, to which it is connected. An electric motor end bracket 100 is placed on the table 104 with its bearing 102 aligned under the injection nozzle 28. A control located on the control panel 32 is then activated supplying air to the air cylinder 22 from a source not shown. This air supply operates to advance the shaft 96 and the apparatus connected thereto. This results in the injection nozzle 28 being inserted into the electric motor bearing 102 and, additionally, clamps the motor end bracket 100 in place. The valve and metering mechanism 20, operates in the manner described in the above-mentioned Tann patent to completely fill the bearing cavity 102 with the metered amount of lubricated wicking material.

The injection of the metered amount of the lubricant impregnated wicking material under proper pressure having been completed the cylinder 22 retracts the shaft 96 and associated mechanism thereby unclamping and freeing the electric motor end bracket 100. The electric motor end bracket 100 with its lubricated bearing is removed and is replaced by an electric motor end bracket with a non-lubricated bearing. The above-described cycle is duplicated so as to fill the new bearing with the proper amount of lubricated wicking material.

The upper casing 46 is so formed that when the lower casing 56 is joined thereto, a portion 75 of the upper casing 46 completely isolates the cylindrical pumping chamber 62 from the power transmission area enclosed by the lower casing 56. This effectively prevents any mixing between the lubricant of the lubricant impregnated wicking material and the lubricant used in the power transmission area. To ensure the smooth and relatively friction-free reciprocation of the piston 72 and its drive means 82 the cylindrical pumping chamber 62 as well as the aperture 83 in the lower casing 56 are provided with lubrication fittings 91 at their outermost portions to permit the introduction of a suitable lubricant to foster the desired smooth reciprocation.

The maximum pressure that is exerted on the lubricant impregnated wicking material is determined by the bypass valve 90 which is set so as to provide just enough pressure in the machine to inject the wicking material from the injection nozzle 28 with sufficient pressure to make certain that it completely fills the cavity surrounding the bearing 102 of the motor end bracket 100. Any excess pressure is delivered by the bypass valve 90 to the hopper 14 through a conduit 92. If desired, the valve 90 can be eliminated and the conduit 92 reduced in diameter so that the smaller diameter of the conduit 92 acts as a constriction and requires a predetermined pressure to be exerted on the wicking material to cause it to flow therethrough. Consequently, if the pressure within the supply line 70 or the valve and metering mechanism 20 or other portions of the machine exceeds this predetermined pressure the wicking material will simply pass through the conduit 92 and back into the hopper 14. When the auger 42 delivers more wicking material than is required, this excess material will also recirculate through the conduit 92 and back into the hopper.

From the foregoing, it will be appreciated that the injection machine of the present invention will continuously pass the wicking material from the hopper 14 out through the injection nozzle 28 without varying the mixture of the wicking materials since the pressure of all points within the injection machine can never be greater than the pressure required to force the wicking material through the conduit 92 and back into the hopper 14. Further, small amounts of the wicking material cannot be trapped at any point within the machine for prolonged periods to impede the flow of the remainder of the wicking material through the machine. Additionally, there can be no commixing between the lubricant of the lubricant impregnated wicking material and the transmission lubricant.

Due to the lack of commingling between the lubricant of the wicking material and that of the power transmission a number of benefits result. Initially, the lubricated wicking material, which may be of a nature so that it is usable in high speed applications, will not become contaminated by the low speed lubrication of the power transmission and a pure product is extruded at the injection nozzle 28. Another benefit which accrues is that the power transmission lubricant is not contaminated by the wicking material lubricant and consequently is better able to perform its task. Furthermore, if it becomes necessary to change the composition of the wicking material, this can be done without changing the power transmission lubrication as well.

While the one specific embodiment of the present invention has been illustrated and described in detail herein, it would be readily appreciated to those skilled in the art that numerous modifications and changes may be made without departing from the spirit and scope of the present invention.

I claim:

1. An improvement for an injection machine for injecting lubricant-impregnated wicking material, the machine being of the type that includes an unrestricted supply line, hopper means communicating with one end of the supply line for storing and continuously forcing the wicking material into the supply line under pressure, positive displacement pump means for positively advancing all of the material in the supply line, drive means for driving the pump means, bypass means communicating the supply line intermediate the ends thereof directly with the hopper means, the bypass means imposing a predetermined back pressure on the material while enabling all material that enters the bypass means to pass progressively therethrough back into the hopper means, and discharge means connected to the other end of the supply line for discharging predetermined quantities of the material, the improvement comprising a first housing, the pump means in the first housing being movable between first and second positions, inlet means through which wicking material can be supplied to the first housing when the pump means is in the first position and outlet means through which the wicking material can be advanced when the pump means moves toward the second position, sealing means for preventing the wicking material from leaking from the first housing, a second housing for holding lubricant for the drive means, the second housing having no communication with the first housing, sealing means for preventing the lubricant from leaking from the second housing, the pump means and drive means both including portions thereof projecting outside their respective housings, means for connecting the portions externally of the housings so that the drive means can move the pump means toward both the first and second positions.

2. The improvement in claim 1, wherein the first and second housings have a common wall.

3. The improvement in claim 1, wherein the means for connecting includes a rigid connection between the projecting portions.

4. The improvement in claim 1, wherein the drive means includes a shaft and eccentric member connected to the shaft and to the portion of the drive means projecting from the second housing so that when the shaft rotates the eccentric member will move the projecting portion back and forth.

* * * * *